United States Patent Office 3,018,186
Patented Jan. 23, 1962

3,018,186
LAMINAR TITANIUM DIOXIDE
Russell L. Jenkins, Dayton, Ohio, assignor to Monsanto Chemical Company, St. Louis, Mo., a corporation of Delaware
No Drawing. Filed Mar. 20, 1957, Ser. No. 647,215
9 Claims. (Cl. 106—253)

This invention relates to the production of titanium oxides in a laminar form having improved physical properties. It is a specific object of the invention to provide titanium dioxide existing in the form of laminal which are of particular utility in ceramic and electrical compositions, in the formulation of plastic and coating compositions, as heat insulating materials and as thickening agents.

It has been found that the preparation of laminar forms of titanium oxides may be carried out by thermal decompositon of solutions of titanium sulfates if the decomposition is carried out with solutions containing from 5% to 20% by weight of free sulfuric acid. Vapor phase decomposition of aqueous or organic solvent solutions of the said sulfates is effected by vaporizing the solutions into a flame of a combustible gas with air or oxygen. The combustion is maintained with a flame temperature of 800° C. to 1,800° C. within the oxidation zone, the particles resulting fom such vaporization being exposed to said temperature for a period of time of from 0.5 second to 0.001 second.

If it is desired to include the oxides of other metals in combination with the titanium oxides, soluble compounds of such metals may be added to the solution of titanium sulfate which is to be atomized. If such salt is reactive with the titanium ion or with the sulfate ion, the addiitional solution may be supplied as a separate stream which may also be separately atomzied. As an example, magnesium oxide may be added to the titanium oxide product by adding the compound magnesium sulfate to the solution which is to be atomized.

The laminar oxides contemplated in the present invention include both single metal oxides and also combinations of oxides. Such combination oxides may be prepared in stoichiometric and non-stoichiometric combination.

The concentration of the titanium sulfate in the solution fed to the flame reaction zone may range from 1% by weight (anhydrous basis) to as high as the saturation limit. Whether organic solvents or water are used to prepare the feed solution in the present process, it is essential that from 5% to 20% by weight of free sulfuric acid be present in the solution. Considerable latitude may be exercised in regard to the solvent employed since numerous solvents in addition to water are available from which a choice may be made. Foremost among the useful organic solvents are the lower alcohols such as methyl, ethyl, propyl, isopropyl, butyl, isobutyl, and tertiary butyl alcohol. Ketones such as acetone and methyl ethyl ketones or cyclic ethers such as dioxane or related ethers may also be employed.

Titanium dioxide has been prepared by oxidation of titanium tetrachloride, but such a process has not been feasible for aqueous solution since it is not practicable to prepare aqueous solutions of titanium tetrachloride on a large scale because of hydrolysis which results in losses of the titanium content, and the formation of hydrochloric acid. Furthermore, aqueous solutions of $TiCl_4$ are extremely corrosive and hence require expensive materials of construction. In addition, oxidation of titanium tetrachloride does not yield the desired laminar form of the oxide.

Metal oxides have been prepared by precipitation from aqueous solutions but such methods have never resulted in the production of laminar forms. Precipitation processes require laborious treating steps, including the handling of large volumes of corrosive liquids. Such methods generally result in the formation of large heterogeneous agglomerates which require expensive grinding procedures to achieve a usable product of uniform particles. Vapor phase methods for producing non-laminar oxides from metal carbonyls are also known. However, it has been found that in the vapor-phase production of pure metal oxides, there is great difficulty in obtaining uniorm particle size and controlled crystal orientation and form, particularly for electrical and magneic applications.

It has now been found that laminar particles of titanium oxides may be prepared by atomizing into a flame a stream of a finely divided solution of titanium sulfate containing from 5% to 20% by weight of sulfuric acid. The oxide particles obtained in this way are of very fine particle size and are characterized by a laminar form. As so prepared, the oxide particles have particular utility in coating compositions since the laminar particles, when applied in a vehicle such as linseed oil, yield a coating in which the individual laminar particles will leaf to form a continuous coating which is resistant against weathering.

The present laminar form of titanium dioxide is characterized by a specific gravity which is less than that of spherical forms of the dioxide. This is advantageous in the manufacture of coating compositions and thickening agents, since industrial products prepared with the present titanium dioxide have a lowe density and thus enable a large volume of product to be obtained from relatively small weight proportions.

The laminar particles obtained in the practice of the present invention are in general leaf- or flake-shaped particles having dimensions in the range of from 0.01 to 0.50 micron average thickness. The average length and width of the flakes has been found to vary within the range of from 1 to 20 microns. The internal crystal structure of the laminar titanium dioxide is almost entirely of the rutile type.

It is a primary object of the invention to produce titanium dioxide having the stoichiometric formula $TiO_2$. However, it is also an embodiment of the present invention to control the oxidation-reduction conditions in a flame reaction in order to produce non-stoichiometric oxides, such as $TiO_{1.95}$. Such oxides contain less than the stoichiometric proportion of oxygen and can be produced, for example, by the use of higher proportions of reducing gases such as hydrogen or hydrocarbons in the combustion flame. Non-stoichiometric oxides such as the compound set forth above have utility in various electrical applications, for example, in semi-conductors.

In operating the present flame process for the production of laminar forms of titanium oxides, it is also possible to produce colored or tinted oxides by the modification of employing a reducing flame having free carbon or hydrogen present. In this way the major product, titanium dioxide which ordinarily is a white material may be modified to have a blue or gray tint. Such a colored product is of utility in the production of coating compositions and as a color correction agent in materials such as white paints which ordinarily exhibit yellowing characteristics upon aging.

The present invention involves the dispersion of the titanium sulfate solution into a combustion flame. The flame may be reducing, oxidizing or neutral in character. The flame is produced by the burning of combustible gases or vapors employing air, oxygen or mixtures thereof to maintain the flame. The combustible gases useful for this purpose are carbon monoxide, hydrogen, methane, ethane, ethylene, propane, propylene, butylene or any of the liquid hydrocarbons obtained from petroleum or coal sources.

The combustion flame, preferably a non-reducing flame is produced in any suitable manner and into this flame is then atomized the solution of titanium sulfate with excess sulfuric acid. This atomization of the solution is effected by employing an atomizing nozzle, the jets of the nozzle being so arranged that the atomized "mist" of solution is projected into the flame. One convenient way to do this involves the use of a compound nozzle provided with separate adjacent peripheral ports to which the respective combustible gases or vapors in the solution are supplied and therein atomized. The solution of titanium sulfate may be atomized by the use of part of the oxidizing gas or by using the combustible gas in known fashion. The flame, whether of an oxidizing, neutral, or reducing character should be maintained at a constant condition. The oxidizing flame has an excess of oxygen relative to the combustible gases. The reducing flame is characterized by a deficiency of oxygen, so that the flame contains an excess of carbon monoxide, hydrogen, etc. These requirements are realized simply by adjusting the relative flow of oxidizing gas with respect to the combustible gas (including any organic liquid employed as a solvent).

The flame temperature employed in the present process is in the general range of 800° C. to 1,800° C. within the reaction zone, the decomposition reaction being carried out for a period of time of from 0.5 second to 0.001 second. The flame temperature obtained during combustion will depend upon the relative proportions of combustible gases to the atomized solution of titanium sulfate fed into the flame. The flame temperature should be so controlled that the final laminar oxide product is burned substantially free of chemical elements (other than the titanium together with the necessary oxygen) present in the feed solution. For example, the final product should be substantially free of sulfur. This point is readily ascertained by simple chemical tests. If traces of residual sulfate are present in the product it will be realized that the temperature was not sufficiently high and measures may then be taken so as to increase the flame temperature to substantially eliminate the sulfur or other elements in the final laminar titanium oxide product.

Another way in which the product is produced free of the residual elements of compounds is to increase the residence time during the heating step. This can be done by adjusting the size or length of the flame so that the particles are maintained in the elevated temperature zone for a longer period of time. Suitable proportioning of the time and speed of the gas stream, having due regard to the temperature therein, enables the product to be made substantially free of undesired elements or compounds.

The preparation of the titanium oxide in laminar form is best carried out in a combustion or heating zone lined with refractory or insulating materials. When operating on a small scale in the laboratory, a quartz tube has been found to form a satisfactory combustion zone. One end of the quartz tube was provided with a suitable atomizing nozzle for supplying atomized solution, and also was equipped with a combustible gas burner. The other end of the quartz tube was connected to a water-cooled receptacle which in turn was connected with a collecting device for the fine particles of the titanium dioxide.

In the production of certain particle sizes and forms of the laminar titanium oxide it is desirable that the particles leaving the oxidizing zone be cooled rapidly in order to "freeze" the particles in the preferred crystalline form. The cooling period is maintained from 0.01 second to 1 second for the particles to reach a temperature of from 100° C to 250° C. for collection. In this way the particles leaving the oxidation zone are repressed from undergoing a further transformation to an undesired crystalline form.

The product obtained was a laminar form of titanium dioxide having particle sizes in the range of 1 micron to 20 micron diameter and 0.01 micron to 0.50 micron thickness. When the particles were subjected to X-ray diffraction analysis, they were found to consist almost entirely of the rutile type. In contradistinction, the use of titanium tetrachloride in a combustion process was found to yield mixtures of the rutile and anatase forms, generally, in approximately equal proportions.

*Example 1*

An aqueous solution of titanium sulfate was prepared by dissolving 1 pound of crude titanium sulfate in water. The crude material analyzed about 20% $TiO_2$ by weight, 50% $H_2SO_4$ and 30% water, and corresponds approximately to the empirical formula $Ti(SO_4)_2 \cdot 2.9H_2O$, which is commonly called titanyl sulfate. The solution prepared by agitating 1 pound of the above crude titanium sulfate with 1 lb. of water yielded a solution containing the equivalent of about 10% $TiO_2$ (based upon the total titanium content) and total sulfate, expressed as $H_2SO_4$, of 25%. This corresponds to about 12.75% free sulfuric acid. In preparing the solution the mixture of the crude sulfate cake and the water was agitated and slowly heated to a temperature of about 70° C.

The above solution of titanium sulfate with 12.75% free sulfuric acid and water was charged to a burner nozzle at the rate of 4.6 lbs. per hour. The solution was atomized in a stream of natural gas flowing at a rate of 7.0 lbs. per hour through the jet of the burner nozzle. The burner was also supplied with a stream of oxygen flowing at the rate of 2 lbs. per hour, and a peripheral air stream flowing at the rate of 155 lbs. per hour to produce a stable flame.

The decomposition reaction was conducted in a vertical tower provided with a wetted-wall collection system and a venturi collector located at the bottom of the reactor in order to remove the slurry of oxide and water from the reactor vessel.

*Example 2*

A solution of titanium sulfate in methanol was prepared similarly to the above aqueous solution by utilizing 1 lb. of the crude titanyl sulfate with 1.2 lbs. of methanol to obtain a solution containing 9.1% $TiO_2$ and 11.5% free sulfuric acid. This solution when subjected to the process of Example 1 yields laminar titanium oxide having an average particle diameter of about 5 microns and an average particle thickness of about 0.05 micron.

*Example 3*

A grease was prepared by mixing 100 grams of heavy lubricating oil with 10 grams of the laminar titanium dioxide of Example 1. It was found that the titanium dioxide served effectively as a bodying agent to provide a grease which was retained on bearing surfaces even when subjected to heat.

*Example 4*

A coating composition was prepared utilizing the above described laminar form of titanium dioxide with the following components expressed by parts by weight.

| | Parts |
|---|---|
| Titanium dioxide | 70 |
| Zinc oxide | 290 |
| Manganese silicate | 400 |
| Linseed oil, alkali refined | 430 |
| Linseed oil, heat bodied | 45 |
| Thinner | 90 |
| Lead naphthenate | 11 |
| Cobalt naphthenate | 1.5 |

The above coating composition had good covering power and resistance to weathering.

The present form of laminar titanium dioxide or other oxides can be ground with linseed oil for incorporation into various paint formulations. Instead of linseed oil as a vehicle, other drying oils have been found to be of utility such as oiticica, soya and tung oils and also vehicles such as turpentine and mineral spirit. Water may also be employed as a vehicle when suitable suspending agents such as carboxymethylcellulose are present in the formulation.

The laminar form of titanium oxides is of particular utility in coating compositions, particularly in thixotropic paints in which the present oxide contributes to the thixoropic effect. Such thixotropic coating composiions may be formulated from alkyd resins mixed with polyamides. Polyamides for this purpose may be obtained by reacting dimerized linoleic alcohol with polyamines, for example, diethylene triamine or triethylene tetramine.

The effectiveness of the laminar form of titanium dioxide in coating composition is shown by the oil absorption value (Gardner method). The oxide of Example 1 was found to absorb 76% by weight of raw linseed oil whereas a sample of commercial titanium dioxide pigment grade absorbed only 46%.

What is claimed is:

1. A process for the production of a laminar form of titanium dioxide which comprises decomposing an atomized solution of titanium sulfate containing from 5% to 20% by weight of free sulfuric acid dissolved in a solvent, the said decomposition being conducted by means of a combustion flame into which the atomized solution is sprayed in order to decompose the same.

2. A process for the production of a laminar form of titanium dioxide which comprises decomposing an atomized solution of titanium sulfate containing from 5% to 20% by weight of free sulfuric acid dissolved in water, the said decomposition being conducted by means of a combustion flame into which the atomized solution is sprayed in order to decompose the same.

3. A process for the production of a laminar form of titanium dioxide which comprises decomposing an atomized solution of titanium sulfate containing from 5% to 20% by weight of free sulfuric acid dissolved in methanol, the said decomposition being conducted by means of a combustion flame into which the atomized solution is sprayed in order to decompose the same.

4. A process for the production of laminar particles of titanium dioxide, the said laminar particles having an average particle diameter of from 1 to 20 microns and a thickness of from 0.01 to 0.50 micron which comprises decomposing an atomized solution of a titanium sulfate in a solvent, the said solution containing from 5% to 20% by weight of free sulfuric acid, and the said decomposition being conducted by means of a non-reducing flame at a flame temperature of 800° C. to 1600° C. for a period of time of from 0.5 second to 0.01 second.

5. A process for the production of laminar particles of titanium dioxide, the said laminar particles having an average particle diameter of from 1 to 20 microns and a thickness of from 0.01 to 0.50 micron which comprises decomposing an atomized solution of a titanium sulfate in water, the said solution containing from 5% to 20% by weight of free sulfuric acid, and the said decomposition being conducted by means of a non-reducing flame at a flame temperature of 800° C. to 1600° C. for a period of time of from 0.5 second to 0.01 second.

6. A process for the production of laminar particles of titanium dioxide, the said laminar particles having an average particle diameter of from 1 to 20 microns and a thickness of from 0.01 to 0.50 micron which comprises decomposing an atomized solution of a titanium sulfate in an organic solvent, the said solution containing from 5% to 20% by weight of free sulfuric acid, and the said decomposition being conducted by means of a non-reducing flame at a flame temperature of 800° C. to 1600° C. for a period of time of from 0.5 second to 0.01 second.

7. A process for the production of laminar particles of titanium dioxide, the said laminar particles having an average particle diameter of from 1 to 20 microns and a thickness of from 0.01 to 0.50 micron which comprises decomposing an atomized solution of a titanium sulfate in methanol, the said solution containing from 5% to 20% by weight of free sulfuric acid, and the said decomposition being conducted by means of a non-reducing flame at a flame temperature of 800° C. to 1600° C. for a period of time of from 0.5 second to 0.01 second.

8. A laminar form of titanium dioxide, the particles of which are laminar in shape and have an average particle diameter of from 1 to 20 microns and an average particle thickness of from 0.01 to 0.50 micron, the said particles resulting from the decomposition of an atomized solution of a titanium sulfate in water, the said solution containing from 5% to 20% by weight of free sulfuric acid, the said decomposition being conducted by means of a non-reducing flame at a flame temperature of 800° C. to 1,600° C., for a period of time of from 0.5 second to 0.01 second.

9. A coating composition comprising a liquid vehicle containing a laminar form of titanium dioxide, the particles of which are laminar in shape and have an average particle diameter of from 1 to 20 microns and an average particle thickness of from 0.01 to 0.50 micron, the said particles resulting from the decomposition of an atomized solution of a titanium sulfate in water, the said solution containing from 5% to 20% by weight of free sulfuric acid, the said decomposition being conducted by means of a non-reducing flame at a flame temperature of 800° C. to 1,600° C., for a period of time of from 0.5 second to 0.01 second.

References Cited in the file of this patent

UNITED STATES PATENTS

| 1,205,267 | Rossi et al. | Nov. 21, 1916 |
| 2,333,948 | Muskat | Nov. 9, 1943 |
| 2,342,483 | Olson | Feb. 22, 1944 |
| 2,369,246 | Peterson | Feb. 13, 1945 |